United States Patent
Zehnpfennig et al.

[11] Patent Number: 5,365,367
[45] Date of Patent: Nov. 15, 1994

[54] HIGH-RESOLUTION SYNTHETIC APERTURE TELESCOPE SYSTEM

[75] Inventors: Theodore F. Zehnpfennig, Wayland; Saul A. Rappaport, Burlington, both of Mass.

[73] Assignee: Visidyne, Inc., Burlington, Mass.

[21] Appl. No.: 79,087

[22] Filed: Jun. 17, 1993

[51] Int. Cl.⁵ .................. G02B 23/04; G02B 27/00
[52] U.S. Cl. ...................... 359/399; 359/419; 359/429; 359/853
[58] Field of Search ............. 359/419, 429, 433, 366, 359/859, 863, 851, 852, 853, 399, 872, 874; 382/43, 54

[56] References Cited

U.S. PATENT DOCUMENTS

| | | |
|---|---|---|
| Re. 33,228 | 6/1990 | Buchtel et al. ............... 359/212 |
| 3,556,630 | 4/1971 | Wilczynski ...................... 359/9 |
| 4,039,246 | 8/1977 | Voigt .............................. 359/220 |
| 4,573,773 | 3/1986 | Arndt et al. .................... 359/431 |
| 4,591,245 | 5/1986 | Schreiter ........................ 359/365 |
| 4,784,700 | 11/1988 | Stern et al. ..................... 359/853 |
| 4,952,042 | 8/1990 | Pinson ........................... 359/429 |
| 5,159,489 | 10/1992 | Massie et al. .................. 359/366 |

*Primary Examiner*—Eugene R. LaRoche
*Assistant Examiner*—Tan Nguyen
*Attorney, Agent, or Firm*—Joseph S. Iandiorio

[57] ABSTRACT

A high-resolution synthetic aperture telescope system includes a primary mirror which is a section of the aperture to be synthesized; and a device for rotating the primary mirror section through a number of angular positions about the aperture being synthesized to obtain a plurality of component images of an object, at least one from each of the positions.

9 Claims, 4 Drawing Sheets

HIGH-RESOLUTION SYNTHETIC APERTURE TELESCOPE SYSTEM

FIELD OF INVENTION

This invention relates to a high-resolution synthetic aperture telescope system.

BACKGROUND OF INVENTION

The most general technique for high-resolution imaging using interferometric methods is to partially fill the entrance pupil of the optical system with a two-dimensional array of collectors, and then combine their signals coherently such that an image of the source is constructed. In this way, the diffraction limited resolution of the full-sized entrance pupil can be approached or equalled. This is the approach used with the Very Large Array in Socorro, New Mexico, and with other image-forming radio interferometers used in the field of radio astronomy. In other environments such as space-borne applications, this approach would require a two-dimensional support structure spanning the desired entrance pupil in order to position the various collectors. This structure would have to be extremely rigid, or, alternatively, the positions of the collectors would have to be monitored continuously using, for instance, a network of auxiliary interferometers. These positional measurements would be used to correct the placement and orientation of the collectors, or to compensate for the optical path length errors from each collector. These requirements would be particularly stringent for instruments working at shorter wavelengths, such as the visible range. In any case, the accuracy and rigidity of the support structure would be compromised by the fact that, for any sizable entrance pupil, the structure would have to be unfolded or erected after being launched into orbit.

The problem is pronounced in space applications where the optical system must typically be packaged, at least during transport, in a generally elongated cylindrical volume from which the telescope is erected once orbit is achieved. The difficulty is in obtaining an accurate, large aperture telescope which can be packaged and transported in a much smaller volume than normally required for the full aperture configuration.

SUMMARY OF INVENTION

It is therefore an object of this invention to provide an improved synthetic aperture telescope system.

It is a further object of this invention to provide such an improved synthetic aperture telescope system which is small, compact, easily fits in an elongated cylindrical volume yet provides high-resolution without sophisticated, complex structural compensation techniques.

It is a further object of this invention to provide such an improved synthetic aperture telescope which has the resolution of a large aperture system but occupies a much smaller volume in transport and in use.

This invention features a high-resolution synthetic aperture telescope system. There is a primary mirror which is a section of the aperture to be synthesized and means for rotating that primary mirror section through a number of angular positions about the aperture being synthesized to obtain a plurality of component images of an object at least one from each of the positions.

In a preferred embodiment there may be means for detecting each of the component images that are to be used for forming the final image and there may be means or reconstructing the final image of the object from the combined images. The primary mirror may be a chordal segment and the chordal segment may be diametrically centered. The means for detecting may include a CCD array. The means for reconstructing the final image may include means for generating the transform of each component image as well as means for applying a weighting function to the transform of each component image to reduce the amplitude of the low spatial frequencies. There may also be adder means for combining the weighted transforms of each of the component images to form a composite weighted transform of the component images, and means for generating the inverse transform of the composite weighted transform to form the final high-resolution image of the object. The means for generating a transform may include means for generating a Fourier transform, and the means for generating an inverse transform may include means for generating an inverse Fourier transform. The primary mirror may include a single monolithic surface or a plurality of discrete spaced subsections.

DISCLOSURE OF PREFERRED EMBODIMENT

Other objects, features, and advantages will occur to those skilled in the art from the following description of a preferred embodiment and the accompanying drawings, in which.

Figure 1:
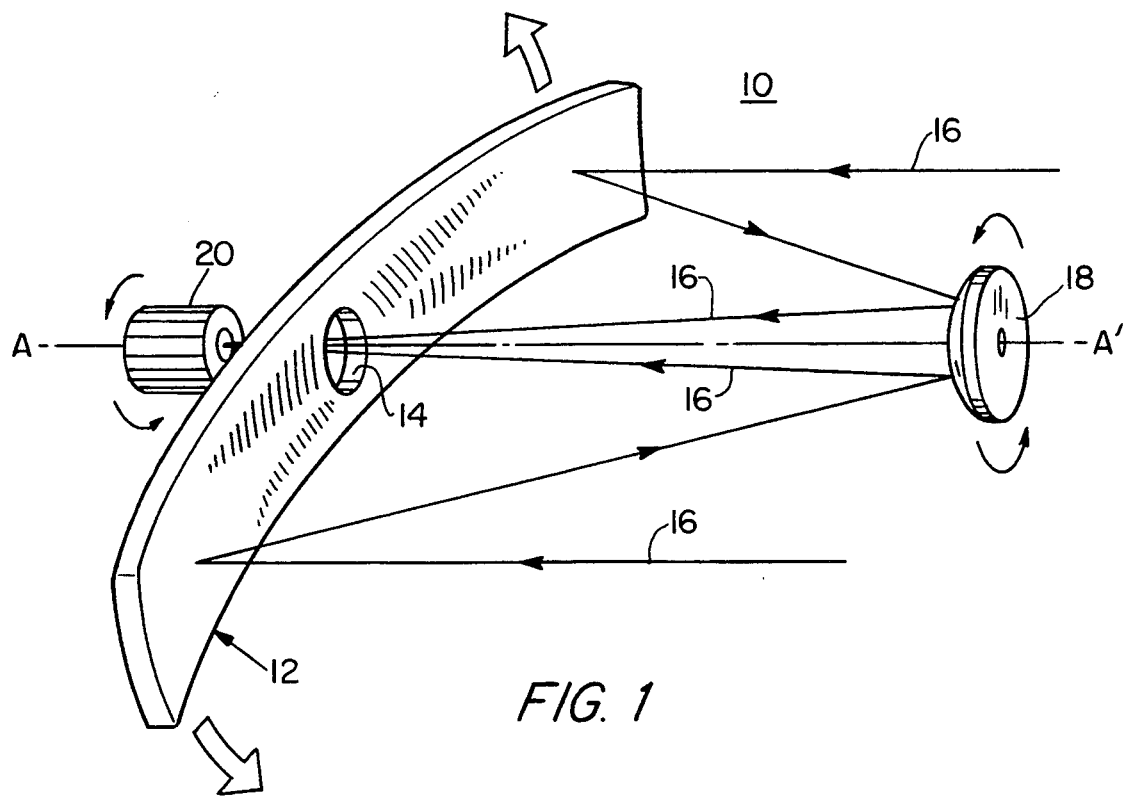
FIG. 1 is a three-dimensional view of a high-resolution synthetic aperture telescope according to this invention.

There is shown in FIG. 1 a high-resolution synthetic aperture telescope 10 including primary mirror 12 which is formed in the shape of a diametrically centered chordal segment of the aperture to be synthesized. Primary mirror 12 may be made of beryllium, aluminum, glass, Pyrex or other conventional materials, and coated with protected aluminum, gold if operation is in infrared range, or any other suitable optical coating. An opening 14 is provided centrally of primary mirror 12 so that incoming light depicted by rays 16 reflected from secondary mirror 18 can pass through to detector assembly 20, which may for example be a CCD array.

Figure 2:
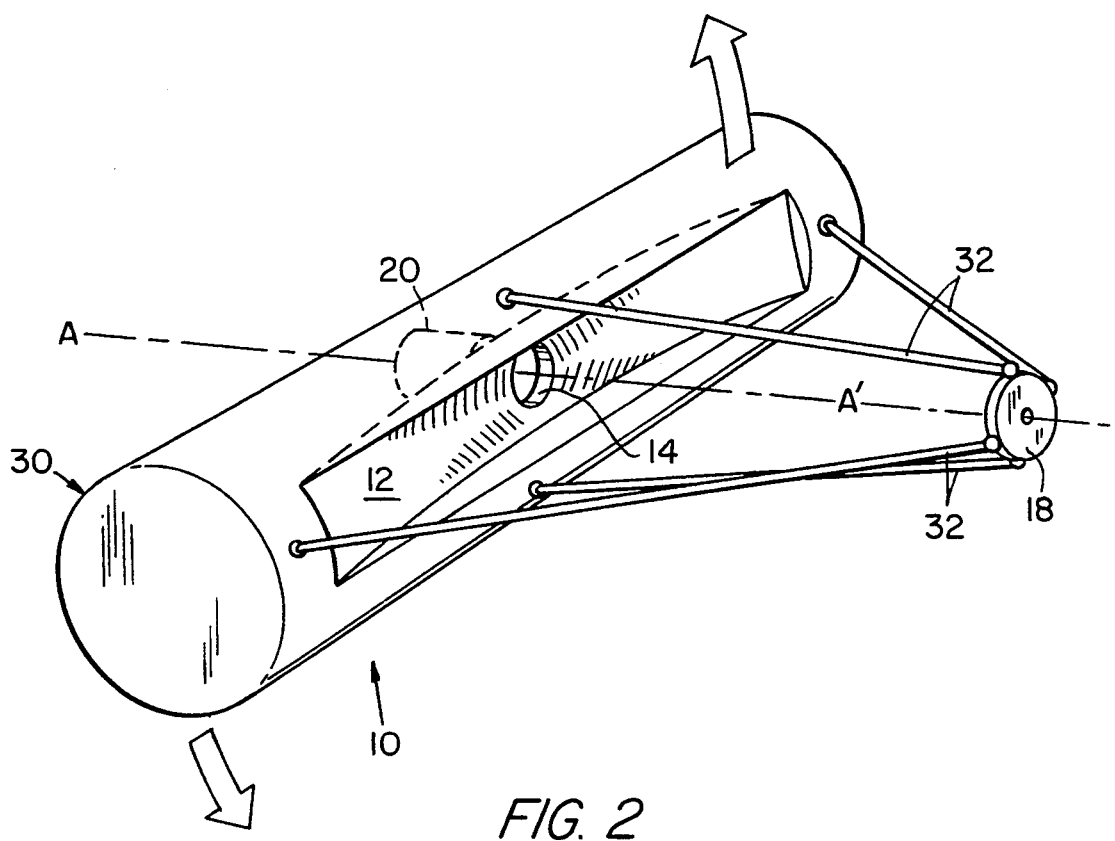
FIG. 2 is a three-dimensional view of the synthetic aperture telescope of FIG. 1 packaged in an elongated cylindrical housing and illustrated with its optical structure erected.

Because of its narrow elongated shape, primary mirror 12 can be stored in an elongated cylindrical volume such as container 30, FIG. 2, where primary mirror 12 is shown with its secondary mirror 18 erected using folding or telescoping booms 32 and with primary mirror 12 still conveniently disposed in container 30. Thus, system 10 easily and conveniently lends itself to being transported in the payload of conventional launch vehicles.

Figure 3:
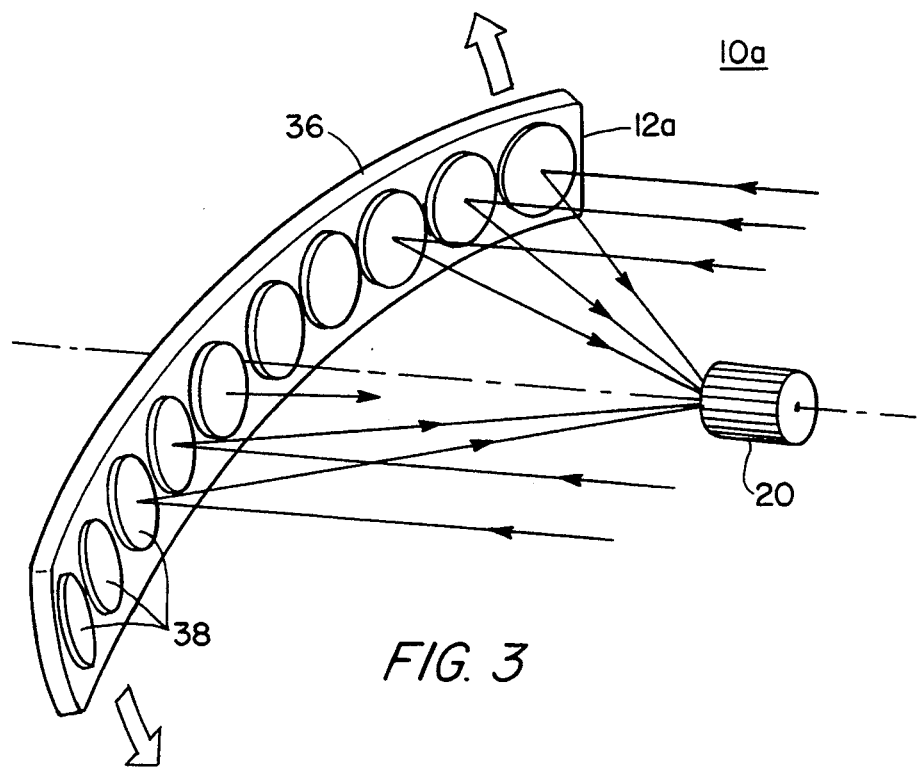
FIG. 3 is a three-dimensional view of a synthetic aperture telescope similar to that shown in FIG. 1 using a plurality of discrete subsections to form the reflecting surface.

Although primary mirror 12 in FIG. 1 is shown as having a monolithic structure, this is not a necessary limitation of the invention. For example, primary mirror 12a, FIG. 3, may include a structural beam 36 made of similar materials as explained with respect to mirror 12 in FIG. 1, but supporting instead of a monolithic surface a plurality of discrete subsections 38, each of which forms a portion of the entire reflecting surface. FIG. 3 also illustrates that a secondary mirror 18 and hole 14 are not required to access detector 20 behind the mirror. In fact, detector 20 can be put at the primary focus in front of mirror 12a.

Figure 4:
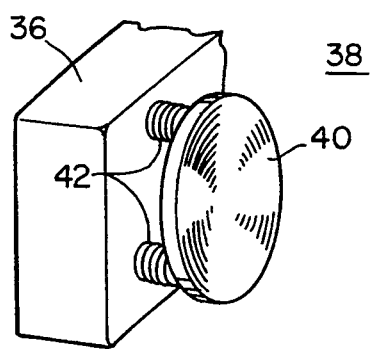
FIG. 4 is an enlarged detail view of a portion of one of the subsections shown in FIG. 3.

Each individual subsection 38, FIG. 4, may include a concave mirror element 40 mounted on a number of actuators 42, of which there are typically three. These are operated electronically to adjust the mirror position to provide the proper imaging in the same way as these adjustments are made in the Keck 10 Meter Telescope on Mauna Kea, Hawaii, for example. Mirror element 40 has a concave reflecting surface which may be roughly spherical, toroidal, or more precisely, paraboloidal or hyperboloidal in shape.

Figure 5:
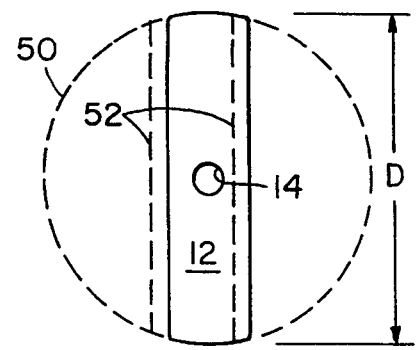
FIG. 5 is a schematic plan view of a chordal segment primary mirror as shown in FIGS. 1-3, and an alternative form of a chordal segment superimposed on the aperture to be synthesized.

While the primary mirror 12 in FIGS. 1-3 is shown as a diametrically centered chordal section of the full aperture 50, FIG. 5, to be synthesized, this is not a necessary limitation of the invention as primary mirror 12 may take any form which is compatible with synthetically creating the aperture. For example, mirror 12 need not be diametrically centered but may be off center and may be larger or smaller than depicted in FIG. 5, as illustrated by chordal section 52 shown in phantom.

Figure 6:
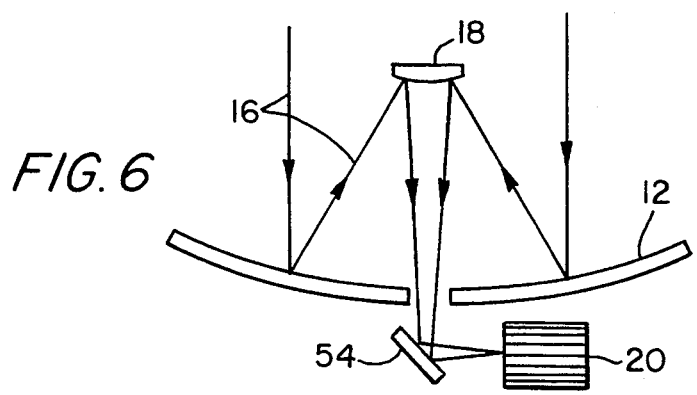
FIG. 6 is a side elevational schematic diagram of a telescope system according to FIG. 1 including a compensation element.

In order to compensate for wobble in the spacecraft or to compensate for rotational smear if the mirror is rotated continuously rather than stepped around to its various positions, a wobble compensation mirror 54, FIG. 6, may be added between secondary mirror 18 and detector 20. In order to finally compensate for wobble and rotation, mirror 54 may be replaced by a compound optical component. Wobble compensation and rotation compensation are accomplished with mirror 54 or more sophisticated optics using an electronic feedback system, as taught in conventional aerial cameras and spacecraft instrumentation.

Figure 7:
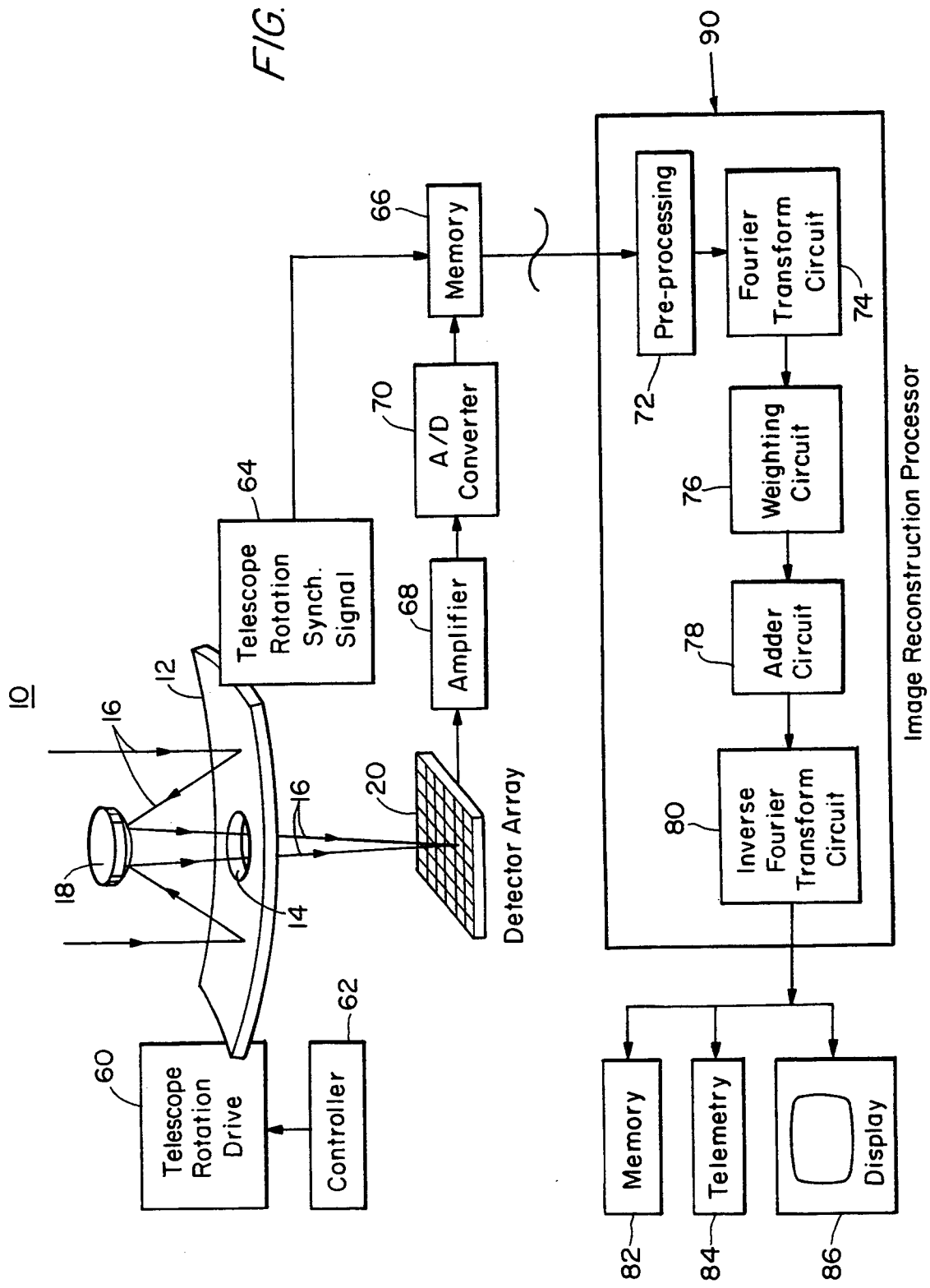
FIG. 7 is a block diagram of a high-resolution synthetic aperture telescope system including the drive and image processing systems.

Telescope system 10 is driven by telescope rotation drive 60, FIG. 7, operated by controller 62 to rotate smoothly and continuously or in steps, as desired. The position of mirror 12 is sensed by the telescope rotation synch signal circuit 64 which provides a synch signal to memory 66. Memory 66 stores the input from detector array 20 which has been passed through amplifier 68 and A/D converter 70. From memory 66 each of the component images is delivered to a preprocessing circuit 72, either directly or through a remote data link. The preprocessing circuit for example corrects for the difference in sensitivity between the individual elements or pixels of the detector array 20. Following this a Fourier transform of the component image is generated in Fourier transform circuit 74. A weighting function is applied in weighting circuit 76 to adjust the low spatial frequency data in each component image, after which each of the component images so weighted are co-added together in adder 78 to form a composite Fourier transform. The inverse Fourier transform is then generated in circuit 80 to provide the final high-resolution image of the object as if produced by the full, diffraction limited aperture being synthesized. The output may then be fed to any desired storage or display device such as memory 82, a telemetric output 84, or a local or remote display 86.

Although Fourier transforms have been used to process the signal in Fig. 7, this is not a necessary limitation of the invention, as other mathematical techniques such as the Maximum Entropy Method can be used to implement the same high-resolution synthetic aperture system.

Figure 8:
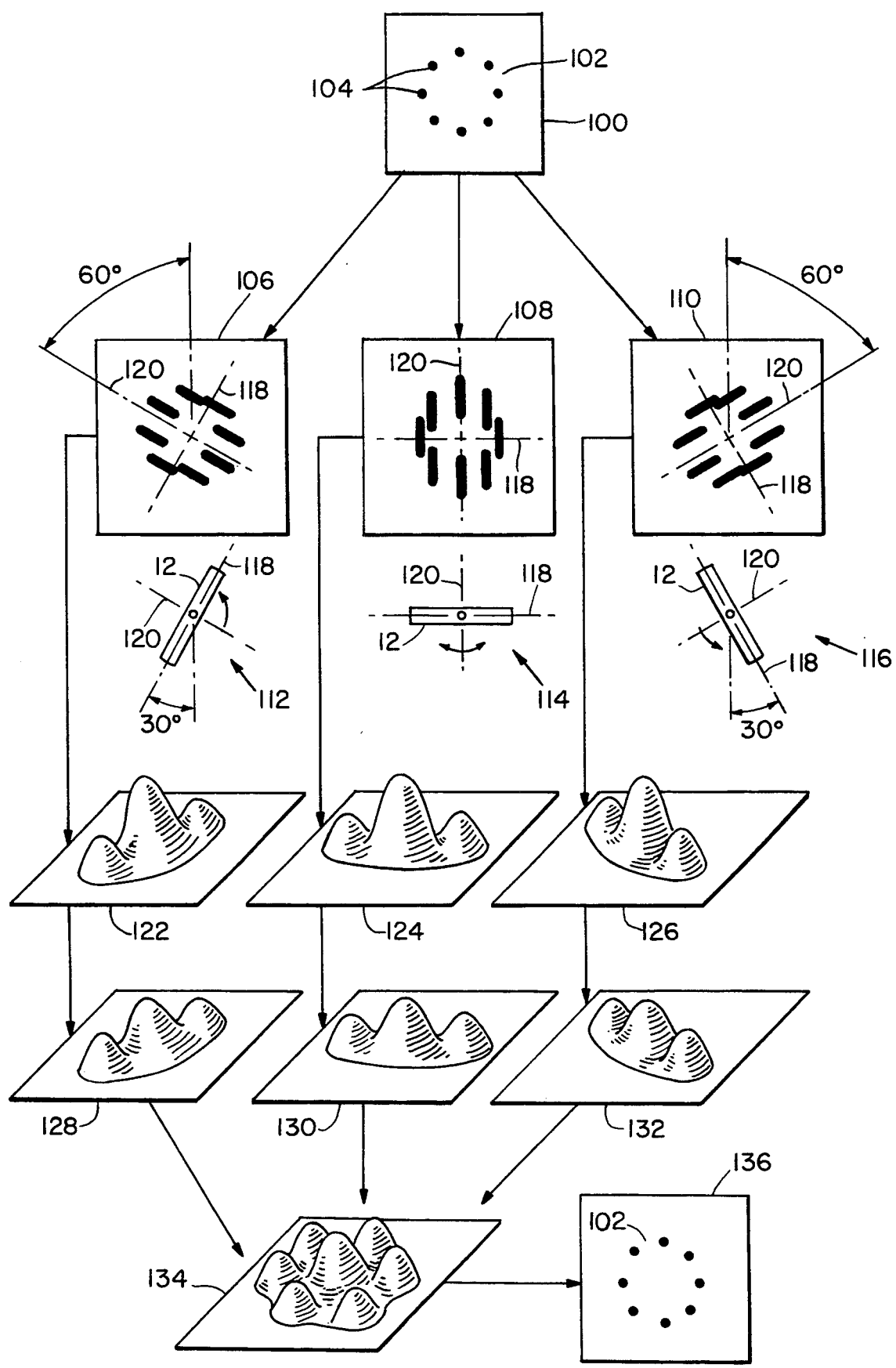
FIG. 8 is a series of graphical illustrations depicting the image processing operations performed by the image reconstruction processor of FIG. 7.

The image reconstruction processor portion 90, which includes Fourier transform circuit 74, weighting circuit 76, adder circuit 78, and inverse Fourier transform circuit 80, provides a series of image reconstruction steps as shown in FIG. 8, where the original object 100 is shown, for purposes of illustration, as a circular locus 102 formed of a plurality of dots 104. Component images 106, 108 and 110 depict the images created by primary mirror 12 at three different rotational positions as shown at 112, 114 and 116, respectively. Three positions are used here only to simplify the illustration; typically more than three would actually be used. Good resolution is obtained along the elongate axis 118 of mirror 12 as depicted in component images 106, 108 and 110, and poorer resolution is obtained perpendicular to that along the lateral axis 120. The real parts of the Fourier transforms of the component images are depicted at illustrations 122, 124 and 126. The real parts of the Fourier transforms are plots of the amplitudes and orientations of the spatial frequencies in the component images.

In the next operation, weighting circuit 76 multiplies each Fourier transform by a weighting function to reduce the amplitude of the low spatial frequency data, providing the modified Fourier transforms shown in illustrations 128, 130 and 132. The amplitude of the low spatial frequency data must be reduced to prevent oversampling of the central region of the Fourier plane, which would result in image degradation. The weighted Fourier transforms are then co-added in adder circuit 78 to form a single composite Fourier transform shown in illustration 134, after which the inverse Fourier transform is generated by circuit 80 to reproduce the high-resolution image 136 of target 102 as if a full aperture, diffraction limited optical element had been employed. Mirror 12 may be rotated through a number of revolutions to improve the image quality obtained by image reconstruction processor portion 90, in the manner of tomographic synthesis as is well known.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A high-resolution synthetic aperture telescope system for obtaining images of an object using electromagnetic radiation which is received within an aperture to be synthesized, comprising:

a primary mirror which covers a chordal section of the aperture to be synthesized; and means for rotating said primary mirror section through a number of angular positions about the aperture being synthesized to obtain a plurality of component images of the object, at least one from each of said positions.

2. The high-resolution synthetic aperture telescope system of claim 1 further including means for detecting each of the component images for forming a final image.

3. The high-resolution synthetic aperture telescope system of claim 2 further including means for reconstructing the final image of the object from the component images.

4. The high-resolution synthetic aperture telescope system of claim 3 in which said means for reconstructing includes means for generating the transform of each component image, means for applying a weighting function to the transform of each component image to adjust the amplitude of the low spatial frequencies; adder means for combining the weighted transforms of each component image to form a composite weighted transform of the component images; and means for generating the inverse transform of the composite weighted transform to form the final, high-resolution image of the object.

5. The high-resolution synthetic aperture telescope system of claim 4 in which said means for generating a transform includes means for generating a Fourier transform and said means for generating an inverse transform includes means for generating an inverse Fourier transform.

6. The high-resolution synthetic aperture telescope system of claim 2 in which said means for detecting includes a CCD array.

7. The high-resolution synthetic aperture telescope system of claim 1 in which said primary mirror covers a diametrically centered chordal section.

8. The high-resolution synthetic aperture telescope system of claim 1 in which said primary mirror includes a single monolithic surface.

9. The high-resolution synthetic aperture telescope system of claim 1 in which said primary mirror includes a plurality of discrete, spaced, sub-sections.

* * * * *